United States Patent
Barillaud et al.

(10) Patent No.: US 9,280,771 B2
(45) Date of Patent: Mar. 8, 2016

(54) SECURE PERSONAL INFORMATION PROFILE

(75) Inventors: Franck Barillaud, Austin, TX (US); Richard P. Christianson, St. Louis, MO (US); Jing Huang, Irving, TX (US); Richard Martin Scott, Flower Mound, TX (US); Joe Wesley Sutton, Jr., Arlington, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2156 days.

(21) Appl. No.: 12/370,665

(22) Filed: Feb. 13, 2009

(65) Prior Publication Data

US 2010/0212003 A1 Aug. 19, 2010

(51) Int. Cl.

| G06F 17/30 | (2006.01) |
|---|---|
| G06Q 40/00 | (2012.01) |
| G06Q 20/38 | (2012.01) |
| G06F 21/62 | (2013.01) |
| G06Q 20/12 | (2012.01) |
| H04L 29/06 | (2006.01) |

(52) U.S. Cl.
CPC .......... *G06Q 20/382* (2013.01); *G06F 21/6263* (2013.01); *G06Q 20/12* (2013.01); *H04L 63/102* (2013.01); *H04L 63/0428* (2013.01); *H04L 2463/102* (2013.01)

(58) Field of Classification Search
CPC ... G06F 21/6263; G06Q 20/12; H04L 63/102
USPC .................. 455/411; 726/1, 8, 22; 380/4, 24; 705/17, 35, 39, 44, 51
See application file for complete search history.

(56) References Cited

U.S. PATENT DOCUMENTS

| 5,336,870 | A | * | 8/1994 | Hughes | G06Q 20/04 235/379 |
|---|---|---|---|---|---|
| 5,754,655 | A | * | 5/1998 | Hughes | G06Q 20/04 235/380 |
| 6,609,113 | B1 | | 8/2003 | O'Leary | |
| 6,618,705 | B1 | | 9/2003 | Wang | |
| 6,675,153 | B1 | | 1/2004 | Cook | |
| 6,760,844 | B1 | | 7/2004 | McCarthy | |
| 6,834,271 | B1 | | 12/2004 | Hodgson | |
| 2003/0004842 | A1 | * | 1/2003 | Williams | G06Q 30/06 705/35 |
| 2003/0083986 | A1 | * | 5/2003 | Kobayashi | G06Q 30/06 705/39 |
| 2004/0158532 | A1 | * | 8/2004 | Breck et al. | 705/74 |
| 2004/0203595 | A1 | * | 10/2004 | Singhal | 455/411 |

(Continued)

*Primary Examiner* — Abu Sholeman
(74) *Attorney, Agent, or Firm* — David A. Mims, Jr.; Parashos Kalatzis; Robert V. Wilder

(57) ABSTRACT

A method, programmed medium and system are provided for implementing a prebuilt and encrypted personal identification information (PII) profile which resides only on a user's computer and is prevented from being permanently stored in a server's database. When a user visits a web site and creates a new account, the site submits a request to query the user's profile using an extension to the HTTP protocol. The user is prompted by the user's browser to grant the site permission to do so and the site automatically uploads a non-personal identifying number (ID) to the user's system to create an account. User-selected fields of the PII are transmitted to the server for processing a user-requested transaction. All personal information remains on the user's computer within the user's encrypted PII profile and is deleted at the server after the completion of the requested transaction.

13 Claims, 4 Drawing Sheets

(56) References Cited

U.S. PATENT DOCUMENTS

| | | |
|---|---|---|
| 2006/0143121 A1* | 6/2006 | Treider et al. .................... 705/39 |
| 2007/0011093 A1 | 1/2007 | Tree |
| 2007/0114273 A1* | 5/2007 | Tsutsui ................ G06Q 20/385 235/379 |
| 2007/0199985 A9* | 8/2007 | Truitt et al. .................... 235/380 |
| 2008/0005220 A1* | 1/2008 | Tsunakawa ............. G06F 9/466 709/201 |
| 2009/0125429 A1* | 5/2009 | Takayama ........................ 705/35 |
| 2009/0248538 A1* | 10/2009 | Taylor .............................. 705/26 |
| 2009/0298480 A1* | 12/2009 | Khambete ......... G06F 17/30699 455/414.1 |

\* cited by examiner

SECURE PERSONAL INFORMATION PROFILE

FIELD OF THE INVENTION

The present invention relates generally to information processing systems and more particularly to a system and methodology for providing secure information exchange over an interconnection network.

BACKGROUND OF THE INVENTION

When visiting different web sites that require setting up accounts, it is typically necessary to retype a user's profile information at each site. The sites also retain copies of user's personal identity information (PII) which makes such information vulnerable to hackers or those who seek to unlawfully obtain the personal information of others. If a user wishes to modify the user's information, the user must visit each site to make necessary changes in the user's PII at each site. Further, once entered, the PII is often difficult to remove from a web site.

Currently, solutions exist that allow users to place their information on trusted third-party "passport-type" servers, but this still puts the PII in the hands of a third-party.

Many companies have stopped promoting general passport services due to security issues.

Thus, there is a need to provide a solution that allows a user to easily but securely create and maintain the user's personal identity information for use in providing such information to selected web sites while substantially decreasing the risk of unauthorized acquision of the user's personal identity information from such websites.

SUMMARY OF THE INVENTION

A method, programmed medium and system are provided for implementing a prebuilt and encrypted personal identification information (PII) profile which resides only on a user's computer and is prevented from being permanently stored in a server's database. In an exemplary embodiment, when a user visits a web site and creates a new account, the site submits a request to query the user's profile using an extension to the HTTP protocol. The user is prompted by the user's browser to grant the site permission to do so and the site automatically uploads a non-personal identifying number (ID) to the user's system to create an account. All personal information remains on the user's computer within the user's encrypted PII profile and is not allowed to be stored in the server's storage. Therefore, each time the user purchases something, the site must again request to query the user's profile for the user's name, credit card information and/or billing address or other information, rather than keeping that information in the web site's datastore. In one example, the system uses the XML-format for the profile data, and the HTTP communications path between the websites and local system and the encryption/security. The storage of the profile separate from the browser allows a "Profile Assistant" to store commonly used/repeated information. The profile storage browser is independent of the network browser and meta-data headers are used to request personal information.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
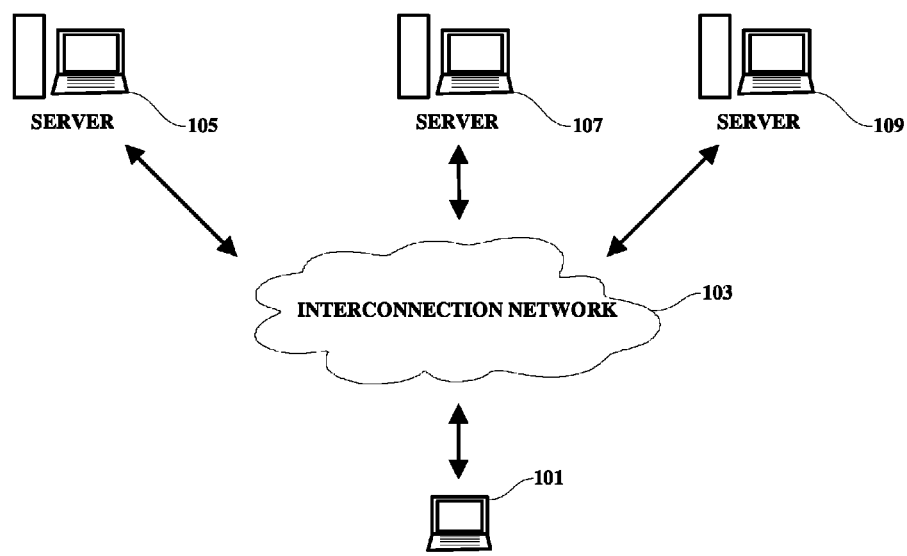
FIG. 1 is an illustration of one embodiment of a system in which the present invention may be implemented.

The various methods discussed herein may be implemented within a computer system which includes processing means, memory, updateable storage, input means and display means. Since the individual components of a computer system which may be used to implement the functions used in practicing the present invention are generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention. Although the invention is illustrated in the context of a networked computer system, it is understood that disclosed methodology may also be applied in many other available and future devices and systems, including hand-held wireless devices, to achieve the beneficial functional features described herein.

In an exemplary implementation, a user is enabled to create and encrypt a personal profile data file which resides only on the user's computer. When a user visits a web site and creates a new account or desires to make a purchase, the site would request to query the user's profile using an extension to the HTTP protocol. The user would be prompted by the user's browser to grant the site permission to do so and the site would automatically upload a non-personal identifying ID to the site's server system to create an account for the user. All personal information would, however, remain on the user's computer within the user's encrypted profile data file. When the user purchases something, the site would again request to query the user's profile for the user's name, credit card information and billing address. This information needs to be requested from the user for each user transaction since the user's personal profile information is maintained only on the user's system and not on any web site's datastore.

The user's profile data is as complete or private as the user wishes (i.e. just a name, or complete credit card info, etc). The authorization to use the profile data may even allow some granularity in how much data to give the site based on the user's trust.

In one example, the system would involve the XML-format of the profile data, and the HTTP communications path between the websites and local system and the encryption/security involved. The exemplary system is unique in the ability to retain this information locally on the user's computer and never requiring the user's personal profile data to be saved on an outside server or database (beyond the scope of a transaction).

In creating a user's personal profile data file, the user uses tools within his/her browser or a desktop tool to create the profile on the user's computer. The profile data may be encrypted to prevent casual users from obtaining this information. The encryption key/password is known only to the user unless the user authorizes otherwise.

The profile XML schema is controlled to ensure all browsers and web servers are enabled to participate in the profile-sharing technology. The profile schema may contain fields such as first name, last name, middle name, billing address, shipping address, email address, date of birth, primary payment method, secondary payment method, company information, etc. The standard is extendable to allow sites to request addition proprietary data be added to the profile. For example, a dentist's website may provide information on how to tag a user's dental insurance carrier and account number in the user's profile. The profile creation tool allows such custom tags to be added.

Web sites requesting user profile information are enabled to specify the requested fields in the HTML header. For example:

```
<head>
    <metadata name='profile_request' value='first_name'/>
    <metadata name='profile_request' value='last_name'/>
</head>
```

In an exemplary operational sequence, a user opens his browser and visits a secure web page that requests user profile information. This is normally restricted to secure pages to avoid spam sites trying to obtain this data. Next, the web site returns a HTTP status code and requested profile fields in the HTTP response. The web browser receives the status code and verifies the site's SSL (Secure Socket's Layer) certificate. The user's browser then alerts the user that the site is verified/unverified and is requesting profile information. The user may then elect to deny the request, or provide a certain level of information based on trust-level. If profile data is to be provided, the user enters the user's password/encryption key. The browser then unencrypts the necessary data and passes the user's profile data along a SSL channel to the requesting web site. The web site uses the profile information for that session/transaction, and then erases the profile information and does not store any PII profile data at the web site. The website may store the user ID field from the profile for future identification purposes but does not store any other of the user's sensitive personal profile data. Users also have the ability within their browsers to automatically reject all profile requests, or automatically provide a certain level of information, much like they have options to not accept cookies.

Referring in greater detail to the drawings, FIG. 1 illustrates an exemplary environment in which the present invention may be implemented. As shown, a user terminal 101, which may be a laptop computer or a hand-held or other wireless device, is connected through an interconnection network 103, such as the Internet, to a plurality of server systems 105, 107 and 109. The server systems 105-109 may include servers for web sites from which a user may initiate a purchase transaction or set-up an account. A user is enabled to set-up a personal profile data file which may include any personal information as the user may determine but none of the servers 105-109 are able to access to the user's data file without the user's authorization as is hereinafter discussed in greater detail. Further, when a user authorizes the transmission of the user's selected personal profile information to a web site server in making a purchase for example, the web site server is disabled from storing any of the personal profile information of the user after the particular purchase transaction has been completed.

Figure 2:
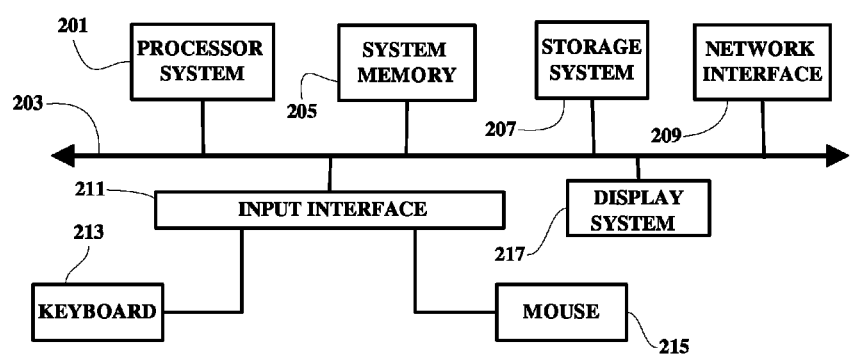
FIG. 2 is a block diagram showing several of the major components of an exemplary computer system using the present invention.

FIG. 2 illustrates several of the major components of a computer system (user terminal and/or server) which may be used to implement the present invention. As shown, a processor system 201 is connected to a main bus 203. The main bus 203 is also coupled to, inter alia, system memory 205, a local storage system 207, a network interface 209, an input interface 211 including connections to a keyboard 213 and a mouse or pointing device 215. The main bus is also connected to a display system 217.

Figure 3:
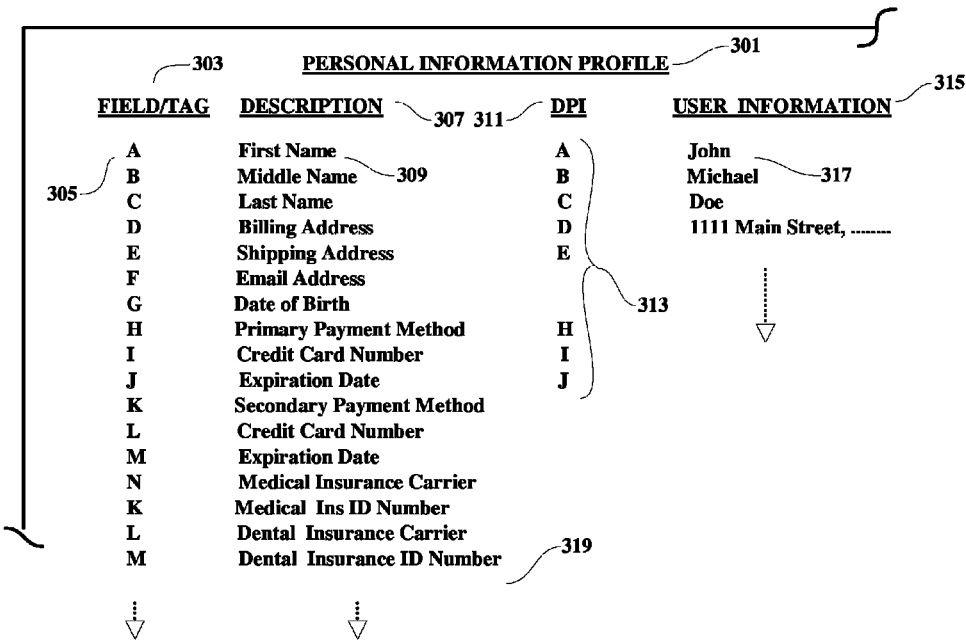
FIG. 3 is an illustration of an exemplary personal information profile.

FIG. 3 is an illustration of an exemplary personal information profile 301 as may be displayed to a user as the user is creating the file. A shown, the profile contains a plurality of data fields and each data field is associated with a field tag 303 such as Tag A 305. Each field also includes a description 307. For example Field A 305 includes the user's "First Name" 309. In another column 311 a user is enabled to designate which of the fields are "Default Payment Instruction" fields 313, i.e. those fields which are most commonly used during a transaction. In making a purchase on-line for example, the user may quickly authorize the default payment instruction fields to be transmitted to a web site for a purchase. Alternatively, during such a transaction, a user may choose to transmit only selected fields which may or may not include the designated default instruction fields. In another column 315 the user is enabled to input data to the listed fields such as the user's First Name "John" 317. The personal information profile 301 may include any number of fields containing any data which the user may choose to provide. By creating the profile off-line, the user is enabled to quickly select data to be provided to a web server during a purchase transaction for example, without undue delay in typing-in the required purchase information for each field on a transaction-by-transaction basis.

Figure 4:
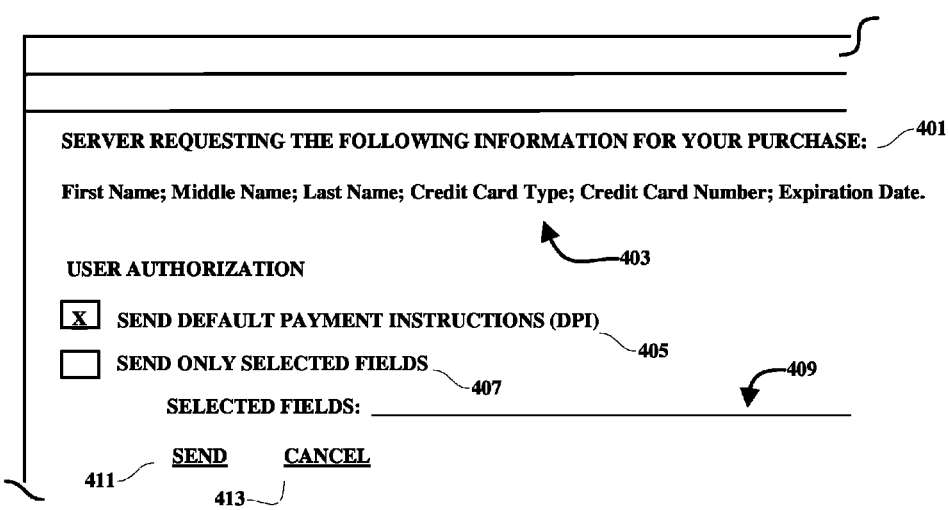
FIG. 4 is an illustration of an exemplary authorization display which may be implemented in practicing the present invention.

FIG. 4 is an illustration of an exemplary authorization display which may be implemented in practicing the present invention. As shown, when a user is, for example, making a purchase on a web site, after the items to be purchased have been selected, the user is prompted to input certain private information 401 including name, credit card type and number, card expiration date, etc. When the server requests this information, a display screen will be presented to the user notifying the user that the server is requesting the user's personal profile information 403 in order to complete the purchase. The user is enabled to select to send the default payment instructions 405 or to send only selected fields 407 as to be determined by the user. If the user wishes to send only selected fields, the selected fields (from FIG. 3) are entered 409 and the user may then either transmit 411 the selected data to the web site or cancel the transaction 413. If the transaction is cancelled, the user's personal profile information is never sent to the web site but remains only in the user's system storage.

Figure 5:
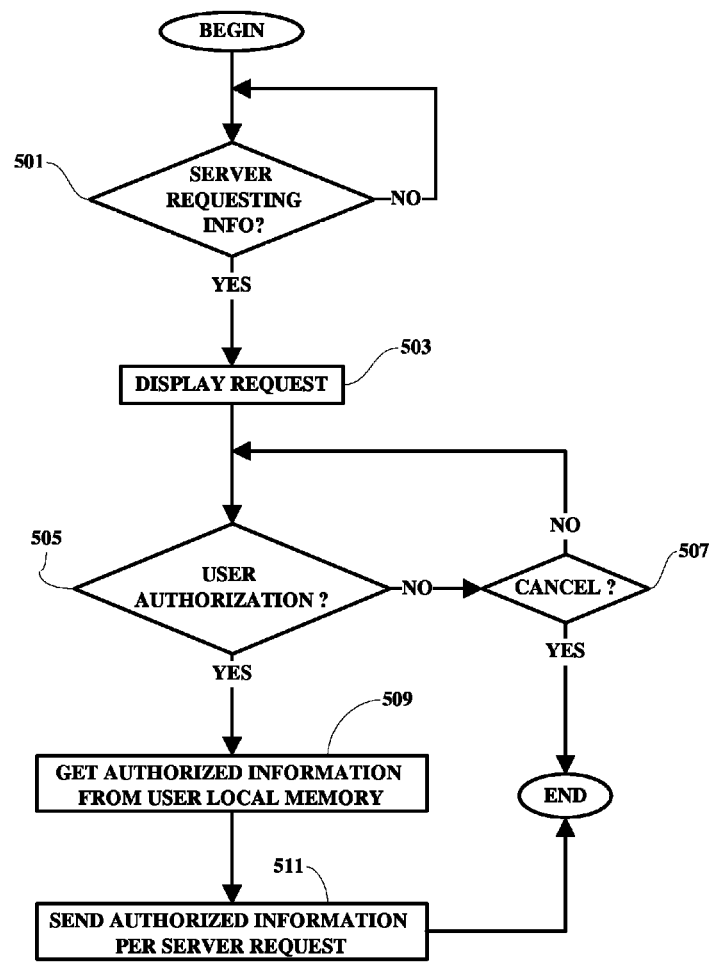
FIG. 5 is a flow chart illustrating an exemplary sequence of user operations which may be implemented in accordance with the present invention.

FIG. 5 is a flow chart illustrating an exemplary sequence of operations which may be implemented in accordance with the present invention. As shown, in one example, when a request 501 for user personal profile information is received from a server, notice of the request (for example as shown in FIG. 4) is displayed to the user 503. At that point, the user is enabled to authorize a response to the request 505 or cancel the transaction 507. If the user wishes to authorize providing the requested information to the web server 505, the user system will get the necessary personal profile information (either default instructions or selected fields) from the user's system 509 and send the authorized information 511 to the requesting web server to complete the purchase transaction.

Figure 6:
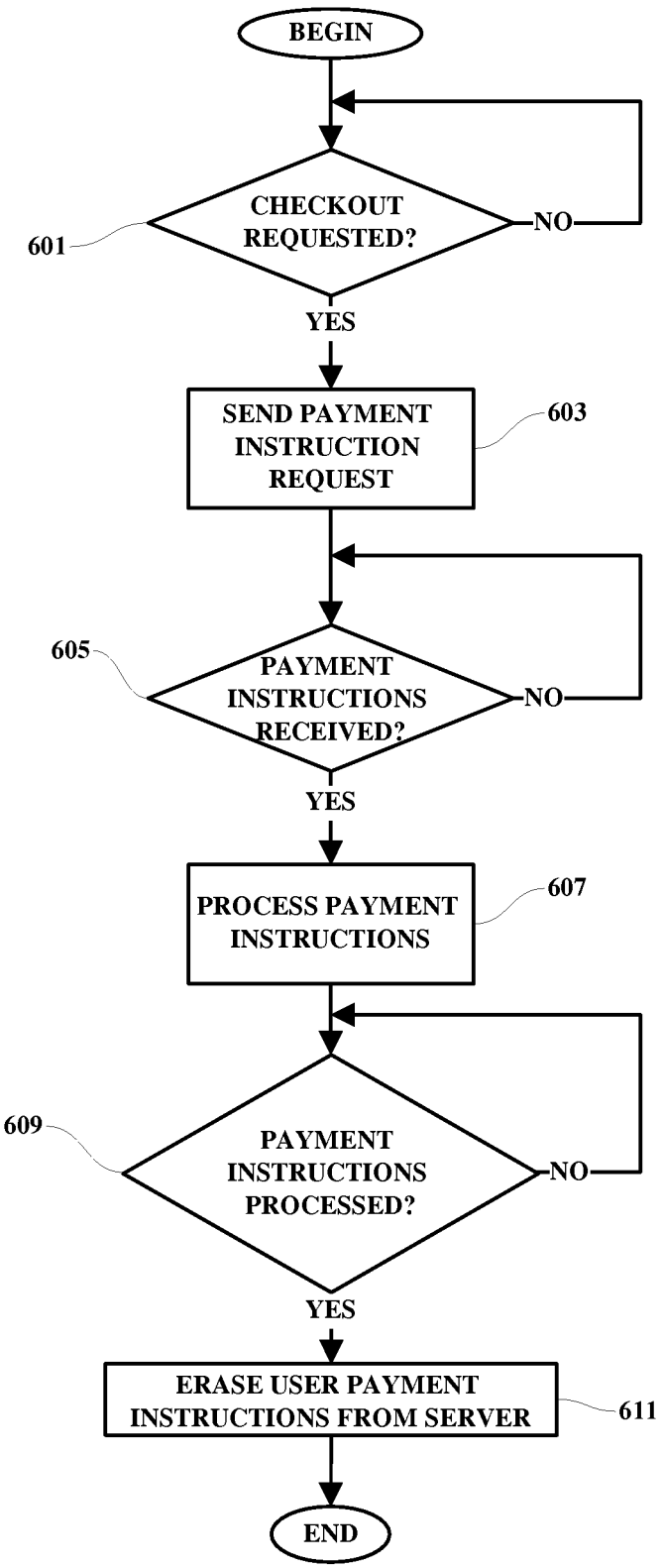
FIG. 6 is a flow chart illustrating an exemplary sequence of server operations which may be implemented in accordance with the present invention.

FIG. 6 is a flow chart illustrating an exemplary sequence of server operations which may be implemented in accordance with the present invention. As shown, when the user requests a checkout 601, the server will send a payment instruction request 603 to the user. Since the user's personal profile information is never stored at the web site server, a new request for the user's personal profile information will have to be sent to the user each time the user makes a new purchase. When the payment instructions have been received from the user 605, the payment instructions are used to process the transaction 607. After it has been determined that the payment process has been completed, the user's personal profile information is erased 611 from the web site server and any other location where the information may have been copied so that the user's personal profile information is not maintained anywhere except on the user's system. The web site processing server or payment processing server has only limited temporary or transient access and use of the user's personal profile information for processing payment and does not maintain the user's personal profile information after the payment processing transaction has been completed. The disclosed limited use methodology may also be implemented for use in accessing a user's account on a website by providing, only for a limited time and only after approval from the user, the user's ID and password which will be erased after the user is given access to the user's account at the processing server.

Thus, all user Personal Identity Information is retained on the user's computer rather than in multiple web site databases and is less vulnerable to website hackers looking for credit card data. The profile data is easier to update since it is centralized on the user's system. Profile data is transportable from one computer to another as an encrypted flat-file. Users do not need to retype the same information at multiple web sites. Logs could be kept locally of all sites who have requested the data and when. Such Logs would be helpful if information is ever stolen or misused. The user is aware of every time a site requests his/her profile and can chose how much PII (Profile Identity Information) to share with the site. The transfer of PII profile data may be set-up such that transfer only occurs with verified sites along SSL connections. Web site privacy statements could be standardized to outline what standard profile information is requested and how it is used. Browsers could use the user's locale information and automatically restrict certain information from being passed to requesting web sites based on the locale's privacy laws. The profile usage could be extended to other applications as well.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in any medium, portable or fixed, volatile or non-volatile memory media device, including CDs, RAM and "Flash" memory, or other semiconductor, optical, magnetic or other memory storage media on which data may be stored, from which it may be loaded and/or transmitted into other media and executed to achieve the beneficial results as described herein. As used herein, the term "medium" refers to a computer readable medium on which information may be stored. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for a processing server to process personal information received from a user of a user device, said method comprising:
  receiving said personal information at said processing server from said user device, said personal information being used by said processing server to process a requested transaction, said requested transaction being one of a plurality of transaction types available at said processing server, said personal information including a plurality of user-selectable fields wherein different transaction types require information from different ones of said plurality of said user-selectable fields;
  initiating a processing of said requested transaction by said processing server; and
  erasing said personal information from said processing server while maintaining said personal information on a non-volatile storage unit within said user device when said requested transaction has been completed.

2. The method as set forth in claim 1 wherein said requested transaction is a purchasing transaction for the purchase of an item using said processing server by said user of said user device.

3. The method as set forth in claim 1 wherein said requested transaction is a log-on transaction for enabling said user to log-on to a user account at said processing server.

4. The method as set forth in claim 1 and further including:
  transmitting a request for said personal information from said processing server to said user device upon receipt by said processing server of a request from said user device to initiate a requested transaction at said processing server.

5. A method for processing personal information to be selectively transmitted from a user of a user device to a processing server to accomplish a requested transaction at said processing server, said requested transaction being one of a plurality of transaction types available at said processing server, said personal information including a plurality of user-selectable fields wherein different transaction types require information from different ones of said plurality of said user-selectable fields, said method comprising:
  displaying a personal information data file on a display system of said user device, said personal information data file including said plurality of user-selectable fields;
  providing means for enabling said user to input personal information to said fields;
  saving said personal information data file on a non-volatile storage unit within said user device;
  providing means for enabling said user to select only selected ones of said fields for transmission of information contained in said selected ones of said fields to said processing server to accomplish said requested transaction; and
  providing means for enabling said user to transmit information from only said selected ones of said fields from said user device to said processing server, said information being designated to be erased from said processing server while maintaining said personal information on a non-volatile storage unit within said user device when said requested transaction has been completed.

6. The method as set forth in claim 5 wherein said requested transaction is a purchasing transaction for the purchase of an item using said processing server by said user of said user device.

7. The method as set forth in claim 5 wherein said requested transaction is a log-on transaction for enabling said user to log-on to a user account at said processing server.

8. The method as set forth in claim 5 and further including:
receiving a request for said personal information from said processing server to said user device following a receipt by said processing server of a request from said user device to initiate said requested transaction at said processing server.

9. A system for a processing server to process personal information received from a user of a user device, said system comprising:
a processing server including means for receiving said personal information from said user device, said personal information being used by said processing server to process a requested transaction, said requested transaction being one of a plurality of transaction types available at said processing server, said Personal information including a plurality of user-selectable fields wherein different transaction types require information from different ones of said plurality of said user-selectable fields;
a processing system for initiating a processing of said requested transaction; and
means configured for erasing said personal information from said processing server while maintaining said personal information on a non-volatile storage unit within said user device when said requested transaction has been completed.

10. The system as set forth in claim 9 wherein said requested transaction is a purchasing transaction for the purchase of an item using said processing server by said user of said user device.

11. The system as set forth in claim 9 wherein said requested transaction is a log-on transaction for enabling said user to log-on to a user account at said processing server.

12. A computer program product comprising a computer-readable, tangible storage device(s) and computer-readable program instructions stored on the computer-readable, tangible storage device(s) for processing personal information received from a user of a user device, the computer-readable program instructions, when executed by a processing server, being operable for implementing a method comprising:
receiving said personal information at said processing server from said user device, said personal information being used by said processing server to process a requested transaction, said requested transaction being one of a plurality of transaction types available at said processing server, said personal information including a plurality of user-selectable fields wherein different transaction types require information from different ones of said plurality of said user-selectable fields;
initiating a processing of said requested transaction by said processing server; and
erasing said personal information from said processing server while maintaining said personal information on a non-volatile storage unit within said user device when said requested transaction has been completed.

13. A computer program product comprising a computer-readable, tangible storage device(s) and computer-readable program instructions stored on the computer-readable, tangible storage device(s) for processing personal information for transmission from a user device to a processing server to accomplish a requested transaction at said processing server, said requested transaction being one of a plurality of transaction types available at said processing server, said personal information including a plurality of user-selectable fields wherein different transaction types require information from different ones of said plurality of said user-selectable fields, the computer-readable program instructions, when executed by a processing system of said user device, being operable for implementing a method comprising:
displaying a personal information data file on a display system of said user device, said personal information data file including said plurality of user-selectable fields;
providing means for enabling said user to input personal information to said fields;
saving said personal information data file on a non-volatile storage unit within said user device;
providing means for enabling said user to select only selected ones of said fields for transmission of information contained in said selected ones of said fields to said processing server to accomplish said requested transaction; and
providing means for enabling said user to transmit information from only said selected ones of said fields from said user device to said processing server, said information being designated to be erased from said processing server while maintaining said personal information on a non-volatile storage unit within said user device when said requested transaction has been completed.

* * * * *